(No Model.) 2 Sheets—Sheet 1.

A. T. HAYS.
MUSICAL GAME DEVICE.

No. 548,312. Patented Oct. 22, 1895.

Witnesses.
G. H. Herrington.
M. S. Hinman

Inventor.
Abbie T. Hays.
By N. B. Hagin.
atty.

(No Model.) 2 Sheets—Sheet 2.

A. T. HAYS.
MUSICAL GAME DEVICE.

No. 548,312. Patented Oct. 22, 1895.

Witnesses
G. H. Herrington
M. S. Hinman

Inventor
Abbie T. Hays,
By N. B. Hagin.
Atty

UNITED STATES PATENT OFFICE.

ABBIE T. HAYS, OF WICHITA, KANSAS.

MUSICAL GAME DEVICE.

SPECIFICATION forming part of Letters Patent No. 548,312, dated October 22, 1895.

Application filed January 14, 1895. Serial No. 534,815. (No model.)

*To all whom it may concern:*

Be it known that I, ABBIE T. HAYS, a citizen of the United States of America, residing at Wichita, in the county of Sedgwick and State of Kansas, have invented certain new and useful Improvements in Musical Games, of which the following is a specification, reference being had therein to the accompanying drawings, and the figures of reference thereon, forming a part of this specification, in which—

Figure 1:
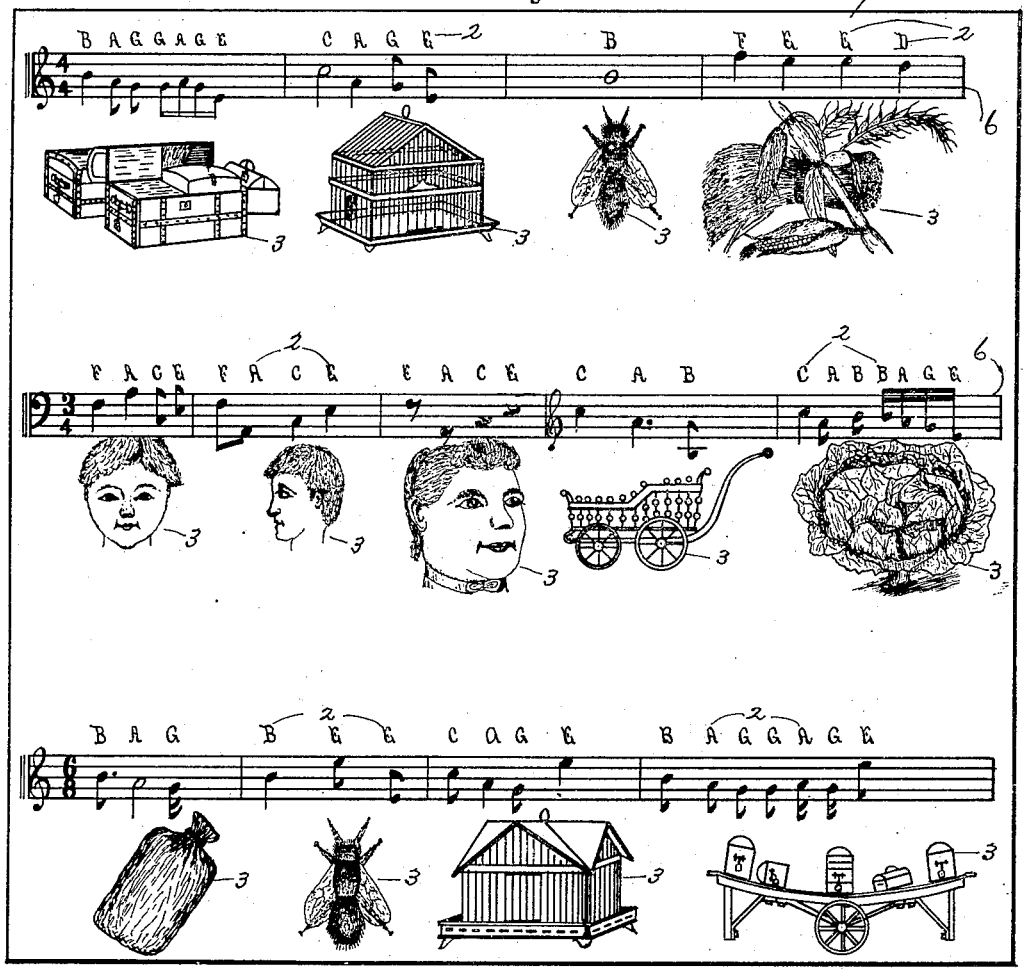
Figure 2:
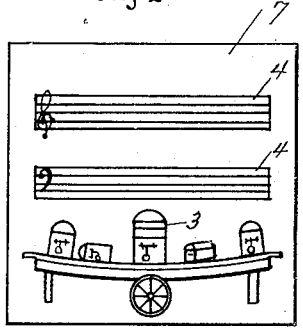
Figure 3:
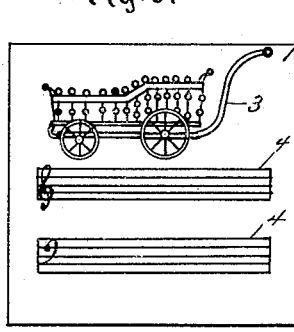
Figure 4:
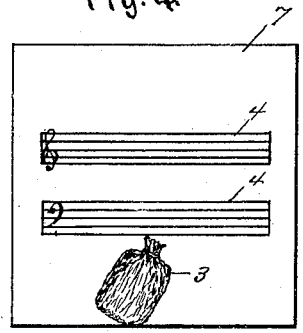
Figure 5:
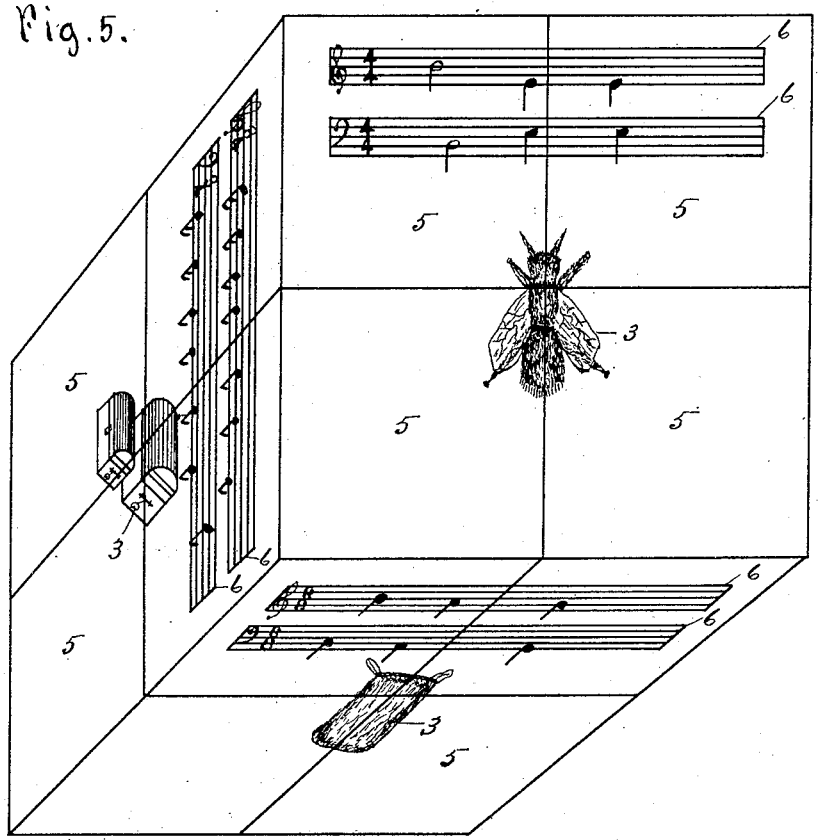
Figure 6:
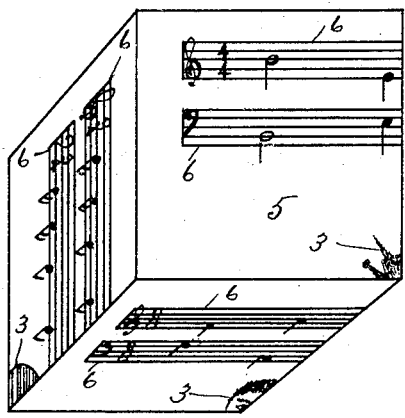

Figure 1 represents a chart with music staves printed thereon with pictures representing the letters on the staff. Figs. 2, 3, and 4 are small cards or slates with the staff printed on them and a picture that represents an article that can be spelled by the letters on the staff. Fig. 5 represents a cubic block made up of several smaller cubic blocks with the staff printed on them and the pictures printed part on the joining corners of each of the blocks. Fig. 6 represents one of the cubic blocks used to make up the large block with part of a staff printed thereon and a part of a picture representing an object, the spelling of which will give the letters of the notes on the staff.

This invention relates to certain improvements in musical games wherein the letters on the staff are represented by pictures, and consists of a chart composed of a staff with the notes, the printed letters above each note and a picture representing the letters on the staff in connection with small cards made of some material that can be written on with a pencil and easily erased, the said cards containing the staff and pictures, also cubic blocks having the staff on all sides with a picture illustrating the letters on the staff.

Referring to the drawings, 1 represents a card on which the staves 6, having the notes, are printed.

2 represents the letters above each note on the staff designating what letter each note is.

3 represents pictures representing some object, the spelling of which will indicate the letters on the staff.

4 represents a staff on which the notes are to be written by pencil to spell the article illustrated by the picture 3 on each slate or card 7.

5 represents cubic blocks on which a staff is printed with the notes and a portion of a picture indicating the notes on the staff. These cards, charts, and blocks are to be used in playing games for the purpose of teaching children to read and write the notes on the staff and are played as follows:

The chart 1 is placed before a class in such a position that all can see it. The cards are then handed out and those in the class are expected to copy that part of the chart 1 on the card that is indicated by the picture on the card. After each pupil has become familiar with the chart the blank cards are passed to the class and the pupil is directed to fill the cards in his hand with notes representing the objects on the cards.

The blocks 5, as represented in Figs. 5 and 6, have the staff printed on all six sides together with part of the pictures on the corner of each block, so that when the blocks are placed properly together the pictures on all sides will be complete, with three sides of each small block exposed, when by changing any one of them they will all have to be changed to make them correspond, thus getting the child familiar with the notes on the staff.

The chart 1 may be used without the cards for the purpose of teaching music to larger pupils.

Having thus described my invention, what I claim as new and useful, and desire to secure by Letters Patent, is as follows:

1. In the herein described musical game apparatus the chart, having a music staff with notes printed thereon, and pictures representing some object, the spelling of which will indicate the notes by letters on the staff.

2. In a musical game, the combination of a chart having a staff with notes printed thereon, the printed letters for indicating what letter each of said notes are, the pictures illustrating some object, the spelling of which will indicate the letters of the notes on the staff, and the cards or slates having the staff and the illustrations printed thereon substantially as shown and described.

ABBIE T. HAYS.

Witnesses:
C. S. CALDWELL,
ROBT. M. PIATT.